United States Patent Office 3,288,568
Patented Nov. 29, 1966

---

3,288,568
DIRECT DISSOLUTION OF WATER - INSOLUBLE URANIUM COMPOUNDS BY CONTACT WITH NEUTRAL ORGANIC SOLVENTS PRETREATED WITH NITRIC ACID
Hiroshi Tomijima, Totsuka-ku, Yokohama, Kazushige Tsukui, Tokyo, and Yoshimi Okoshi, Kawasaki-shi, Japan, assignors to Tokyo Shibaura Electric Co., Ltd., Kawasaki-shi, Japan, a corporation of Japan
No Drawing. Filed Oct. 20, 1961, Ser. No. 146,447
Claims priority, application Japan, Nov. 18, 1960, 35/45,357
9 Claims. (Cl. 23—319)

This invention relates to the method for purifying nuclear fuel materials. More particularly, it relates to a method for purifying nuclear fuel materials by contacting the same with a neutral organic solvent which has been treated with an inorganic acid.

Among the purifying methods of nuclear fuel materials having heretofore been conducted, there are a method in which an aqueous solution or solid of a water-soluble compound of these elements is extracted by an organic solvent to yield the purified elements; a method in which a matrial containing these elements is mixed with an inorganic acid, and the mixture is contacted with an organic solvent to extract these elements; and a method in which a solid containing nuclear fuel materials is contacted with an acidic organic solvent, for example di-2-ethyl-hexyl hydrogen phosphate, without using inorganic acid in the prior step, thereby uranium being extracted from the solid.

An object of the invention is to provide a purifying method of a water-insoluble compound of nuclear fuel materials, such as various oxides, metals, carbides of uranium, plutonium, and the like, and their molded articles, which method does not involve a separate procedure of once converting the compound to a water-soluble compound. Other objects will be apparent from the description which follows.

According to the present invention, thus, a method for purifying nuclear fuel materials is provided, in which a water-insoluble nuclear fuel material is contacted with a neutral organic solvent that includes an inorganic acid in a complex compound form with the solvent or in a simple dissolved form through contact of the acid with the solvent, thereby to separate from the impurities and to be extracted in the organic solvent.

According to the purifying method of the present invention, extracting ratio and degree of purification of the nuclear fuel material to be extracted can be increased by selection of a mixing ratio of a neutral organic solvent and a diluent, content of an inorganic acid in the extracting solvent volume of the extracting solvent used, extracting time, extracting temperature, size of the water-insoluble nuclear fuel material, and the kind of extracting neutral organic solvent. The facts that a specific step of converting the water-insoluble nuclear fuel material to a water-soluble, or other, compound may be omitted, and dissolution and extraction can be effected combinedly in one procedure, and that stirring or agitation for dissolution and extraction is not necessarily continued, thus a simpler apparatus suffices, are advantages of the method of the invention. Ordinarily, when the water-insoluble nuclear fuel material is converted to a water-soluble compound or a compound extractable with an extracting organic solvent, an excess amount of an acid is to be used, so that it causes a wasteful spending and needs apparatus and labor for the recovery. According to the purifying method of the invention, however, spending amount of the inorganic acid is limited to the theoretical amount, or an amount somewhat larger than that, for converting the material to a compound extractable by the extracting solvent, thereby the amount of the inoganic acid required being smaller and the cost for recovering the acid being not needed. Furthermore, purity of the nuclear fuel material is remarkably superior than that obtained according to the conventional method, for example the one extracted by an acidic organic phosphorus compound, e.g. di-2-ethyl-hexyl hydrogen phosphate. When extraction of a nuclear fuel material from a nuclear spent fuel having a higher radioactivity after being used for radiation in atomic pile is applied to the present method, a gentle solvent extraction is possible and cost of equipment is reduced. Moreover, after decrement of the radio-activity to some extent, it is possible to allot the cooling time of the nuclear fuel to the time for extraction and extraction. In this case, physical form of the fuel is not important, and the method can be directly applied to the metals, oxides, carbides, and their sintered products.

Among the neutral organic solvent employed in the purifying method of the invention, there are neutral alkyl phosphorus compound, such as trialkyl phosphate, dialkyl alkylphosphonate, alkyl dialkylphosphinate, trialkylphosphine oxide, ethers, esters, ketones, and the like. This solvent may preferably be diluted to a required concentration with a suitable water-insoluble organic diluent, such as kerosene, hexane, carbon tetrachloride, and the like, according to the condition employed. This solvent is shaken, prior to use for contact with the nuclear fuel material, with an inorganic acid, thereby involving the inorganic acid in a complex compound form with the solvent or in a simple dissolved form. The content of the inorganic acid in the solvent after the acid treatment is adjusted according to the concentration of the neutral organic solvent in the mixture of the same with the diluent, the concentration of the inorganic acid, and contacting period of time. As to amount of the inorganic acid, powdered uranium oxide or yellow cake spends almost theoretical amount of it, based upon the compound extracted into the extracting solvent, but pellets of uranium oxide or uranium carbide, or metallic uranium needs somewhat larger amount than the theoretical one. Nitric acid contents in the solvents, i.e. tributyl phosphate, dibutyl butylphosphonate, and methyl isobutyl ketone, in cases of shaking the solvents with the same amount of nitric acid for five minutes, are shown in Table 1.

Table 1

| Neutral solvent | Diluent | Volume percent of neutral solvent in extracting solvent | Concentration of nitric acid for treatment of solvent, M/l. | Nitric acid concentration in solvent after nitric acid treatment, M/l. | Uranium concentration in solvent after extraction, M/l. |
|---|---|---|---|---|---|
| Tributyl phosphate | Kerosene | 30 | 5 | 0.85 | 0.4412 |
| Do | do | 30 | 9 | 1.00 | 0.4935 |
| Do | do | 50 | 5 | 1.30 | 0.7650 |
| Do | do | 50 | 7 | 1.55 | 0.8700 |
| Do | do | 100 | 5 | 1.88 | 0.9500 |
| Do | do | 100 | 7 | 2.41 | 1.2300 |
| Dibutyl butylphosphonate | do | 30 | 5 | 0.99 | 0.5460 |
| Do | do | 30 | 7 | 1.10 | 0.5995 |
| Do | do | 50 | 5 | 1.47 | 0.7500 |
| Do | do | 50 | 7 | 1.66 | 0.8610 |
| Do | do | 100 | 5 | 2.16 | 1.0300 |
| Do | do | 100 | 7 | 2.77 | 1.3800 |
| Methyl isobutyl ketone | do | 100 | 1 | 0.11 | 0.04 |
| Do | do | 100 | 3 | 0.65 | 0.23 |
| Do | do | 100 | 4 | 1.07 | 0.356 |
| Do | do | 100 | 5 | 1.40 | 0.47 |

Upon contact of water-insoluble solid nuclear fuel material with an organic solvent thus containing inorganic acid, the solvent dissolves and extracts the nuclear fuel material. The rightmost column of the Table 1 shows saturated concentration of uranium in the solvent in case of extracting uranium from powdered uranium dioxide of $0.5\mu$ average particle size, which has been reduced by hydrogen at 900° C. Thus, uranium is dissolved up to about ½, in case of alkyl phosphorus compound, and about ⅓, in case of methyl isobutyl ketone, of mol concentration of nitric acid in the extracting solvent used. This may be because substitution of solvates mainly serves for extracting action. Application of the present extraction is also possible with uranic concentrate as with powdered uranium dioxide. In this case, a larger part of the impurities in uranium concentrate remains undissolved in uranium extracting solvent. Also, uranium can be directly extracted and purified from solid moldings (shaped articles) of uranium, for example sintered uranium dioxide, sintered uranium carbide, graphite-uranium dioxide press moldings, and metallic uranium, by use of the neutral organic solvent treated with an inorganic acid.

The solvent extracting the nuclear fuel materials out is filtered to remove undissolved residue of impurities, and then scrubbed and stripped to yield an aqueous solution of purified nuclear fuel materials.

In extraction of nuclear fuel material from a water-insoluble solid nuclear fuel material by use of a neutral organic solvent treated with an inorganic acid, uranium concentration in organic solvent increases with increase of contacting time. Longer period of time is necessary for complete dissolution in cases of sintered uranium dioxide and sintered uranium carbide, when compared with the cases of powdered uranium dioxide, uranic concentrate sintered graphite-uranium dioxide, and metallic uranium. In any case of solid, the finer the degree of pulverization or comminution is, the higher the extracting velocity is.

Now, the present invention will more fully be described with reference to the following examples, which are, however, provided merely by way of illustration and not by way of limitation.

EXAMPLE 1

A 5 grams portion of a uranic concentrate containing about 80% of triuranium octoxide, which has been pulverized up to about 200 mesh through, is shaken at the ordinary temperature with a 35 ml. portion of 30% tributyl phosphate/kerosene which has been treated with the same amount of 10 Normal nitric acid. The uranium concentration in the solvent increases, as shown in Table 2. Almost 80% of the uranium value in the material is extracted within 30 min.

Table 2

| Extracting time (hr.): | Uranium concentration in solvent, M/l. |
|---|---|
| 0.5 | 0.35 |
| 2 | 0.35 |
| 3 | 0.35 |
| 4 | 0.35 |
| 5 | 0.352 |
| 48 | 0.406 |

The extracting velocity is influenced by temperature. Especially when uranium is extracted from sintered uranium dioxide, the effect of temperature is remarkable, thus, the extracting time being shortened by warming the solvent up to about 50° C. This fact is shown in the next example.

EXAMPLE 2

A 3 gram portion of fragments of sintered uranium dioxide, which has been sintered at 1700° C. and has density of 95%, is immersed into 55 ml. of tributyl phosphate/kerosene which has been treated with the same amount of 10 Normal nitric acid, to dissolve and extract uranium completely. As shown in the Table 3, the extracting time required is exceedingly shortened by warming the solvent up to 50° C.

Table 3

| Extracting temperature (° C.) | Extracting time (hr.) | Uranium concentration in solvent (M/l.) | Yield of uranium (percent) |
|---|---|---|---|
| 22 | 168 | 0.2183 | 99.7 |
| 50 | 15 | 0.2183 | 99.9 |

In extraction of nuclear fuel from water-insoluble solid nuclear fuel material by use of a neutral organic solvent treated with an inorganic solvent, the yield depends upon the volume of the solvent employed in the extraction. This fact is shown in the next example.

EXAMPLE 3

A 5 grams portion of a uranic concentric containing about 80% of triuranium octoxide, which has been pulverized up to about 200 mesh through, is extracted at the room temperature by various solvents which have been treated with the same amount of nitric acid. The results are set forth in Table 4.

Table 4

| Neutral solvent | Diluent | Volume of neutral solvent in extracting solvent, percent | Concentration of nitric acid for the treatment, M/l. | Volume of extracting solvent, ml. | Uranium concentration in extracting solvent | Yield of uranium |
|---|---|---|---|---|---|---|
| Tributyl phosphate | Kerosine | 30 | 5 | 35 | 0.390 | 90.7 |
| Do | do | 30 | 5 | 45 | 0.326 | 95.6 |
| Do | do | 30 | 7 | 32 | 0.420 | 86.0 |
| Do | do | 30 | 7 | 40 | 0.367 | 98.5 |
| Dibutyl butylphosphonate | do | 50 | 5 | 20 | 0.660 | 92.5 |
| Do | do | 50 | 5 | 22 | 0.650 | 99.0 |

Then, examples of extractions of uranium from graphite-uranium dioxide press moldings, uranium carbide moldings, and metallic uranium, by use of neutral organic solvent treated with an inorganic acid.

EXAMPLE 4

The following Table 5 sets forth the results of uranium extraction from pressed pellets of graphite-uranium dioxide containing about 4.22% of uranium dioxide by use of tributyl phosphate treated with nitric acid of same volume as solvent. If the samples have not been treated at too high temperature, the graphite is wholly dispersed and settled in the solvent according to progress of dissolution and extraction of the uranium dioxide into the solvent. The solvent after extraction of the uranium is filtered to separate from the graphite, the latter being washed several times with kerosene to remove the uranium-containing solvent adhered thereon, while the washings being combined with the filtered extracting solvent mentioned above. The extracting solvent is scrubbed and stripped to yield a purified uranium solution.

Table 5

| Neutral solvent | Diluent | Volume of tributyl phosphate in extracting solvent, percent | Concentration of nitric acid for treatment, M/l. | Volume of extracting solvent, ml. | Weight of Graphite-UO2 pellet, g. | Yield of uranium, percent |
|---|---|---|---|---|---|---|
| Tributyl phosphate | Kerosine | 10 | 5 | 4 | 3 | 78.0 |
| Do | do | 10 | 5 | 6 | 3 | 87.4 |
| Do | do | 10 | 5 | 8 | 3 | 90.0 |
| Do | do | 10 | 7 | 10 | 10 | 98.4 |

EXAMPLE 5

The following Table 6 sets forth the results of extraction at room temperature of uranium from fragments of sintered uranium carbide by use of neutral alkyl phosphorus compounds containing nitric acid which has been treated in same way as preceding example.

Table 6

| Neutral solvent | Diluent | Volume of neutral solvent in extracting solvent, percent | Concentration of nitric acid for treatment, M/l. | Volume of extracting solvent, ml. | Weight of sintered uranium carbide pellet, g. | Immersing time | Yield of uranium, percent |
|---|---|---|---|---|---|---|---|
| Tributyl phosphate | Kerosine | 50 | 10 | 15 | 1 | 60 | 59 |
| Do | do | 70 | 10 | 10 | 1 | 60 | 68.2 |
| Dibutyl butylphosphonate | do | 50 | 10 | 15 | 1 | 60 | 58.8 |
| Do | do | 70 | 10 | 10 | 1 | 60 | 58.8 |

EXAMPLE 6

The following Table 7 sets forth the results of extraction at room temperature of uranium from lathe scraps of metallic uranium by use of a neutral alkyl phosphorus compound which has been treated in same way as preceding example. A larger part of the impurities in the metallic uranium is deposited in the uranium-extracting solvent as undissolved residue.

Table 7

| Neutral solvent | Diluent | Volume of tributyl phosphate in extracting solvent, percent | Concentration of nitric acid for treatment, M/l. | Volume of extracting solvent, ml. | Weight of metallic uranium, g. | Immersing time, days | Yield of uranium |
|---|---|---|---|---|---|---|---|
| Tributyl phosphate | Kerosene | 30 | 7 | 15 | 1 | 10 | 99.0 |
| Do | do | 50 | 10 | 10 | 1 | 3 | 99.5 |

Then, uranium is directly extracted from a water-insoluble solid by use of an extracting solvent prepared by pretreatment of a neutral organic solvent with an inorganic acid, thereby containing the latter. The extracting solvent is scrubbed with a small amount of water or an inorganic acid, and thereafter uranium is stripped therefrom by use of pure water. To the resulting aqueous uranium solution is added ammonia to form precipitate of ammonium diuranate, which, after separation, washing and drying, is calcined in a quartz boat at 950° C. in air to form triuranium octoxide. The following Table 8 sets forth the impurities in the thus formed triuranium octoxide. The extracting solvents 1 to 4 employed in the table are shown in the Table 9. The concentration of nitric acid in Table 9 means that of treating aqueous phase of same volume as solvent.

Table 8

| Uranium material | Weight of uranium material, g. | No. of extracting solvent | Volume of extracting solvent, ml. | Impurities in uranium (p.p.m.) | | | | | | | | | | | |
|---|---|---|---|---|---|---|---|---|---|---|---|---|---|---|---|
| | | | | B | Cd | Cr | Cu | Fe | Mn | Mo | Ni | P | Si | Ag | V |
| Uranic concentrate | 5 | 1 | 22 | 0.5 | 0.5 | <12 | 1-6 | 10 | >24 | <0.5 | <13 | >200 | >125 | <0.2 | <10 |
| Do | 5 | 2 | 40 | 0.25 | <0.1 | <12 | 1 | 55 | 12 | 1.5 | <6 | 20 | >125 | <0.2 | <1 |
| Lathe scraps of metallic uranium | 1 | 3 | 10 | 0.25 | <0.2 | <12 | 1-6 | 10-20 | 0.5 ~3 | <0.5 | <13 | 100 | >125 | <0.2 | <10 |
| Do | 1 | 4 | 15 | <0.25 | <0.2 | <12 | 1-6 | 10-20 | <0.5 | <0.5 | <13 | <20 | 60 | <0.2 | <10 |

Table 9

| No. of extracting solvent | Neutral organic solvent | Diluent | Volume of neutral organic solvent in extracting solvent, Percent | Concentration of nitric acid for treatment of extracting solvent, M/l. |
|---|---|---|---|---|
| 1 | Dibutyl butylphosphonate | Kerosene | 50 | 7 |
| 2 | Tributyl phosphate | do | 30 | 7 |
| 3 | do | do | 50 | 10 |
| 4 | do | do | 30 | 7 |

Next, an example is shown, wherein ether is employed as the neutral organic solvent.

EXAMPLE 7

Into a 10 cc. portion of ethyl ether, which has been treated with the same volume of 5 Normal nitric acid, is immersed uranium dioxide powder of 0.5µ average particle size, which has been reduced by hydrogen at 900° C. The uranium is completely extracted into the ether at room temperautre after 90 min.

EXAMPLE 8

A 5 grams portion of uranic concentrate is immersed into 40 ml. of 50% butyl acetate/kerosene, which has been shaken with the same volume of 10 M/l. nitric acid, uranium is completely extracted.

What we claim is:
1. A method of directly extracting uranium material from a water-insoluble uranium-containing compound without any preliminary dissolution thereof with acid which comprises treating a neutral organic solvent selected from the group consisting of trialkyl phosphates, dialkyl alkylphosphonates, alkyl dialkylphosphonates, trialkylphosphine oxides, ethers, esters and ketones with nitric acid, contacting said compound with said treated solvent whereby said uranium material is both separated from impurities and extracted into said organic solvent.

2. A method according to claim 1, wherein said water-insoluble uranium containing compound is a uranium ore concentrate.

3. A method according to claim 1, wherein said water-insoluble uranium containing compound is a sintered uranium dioxide.

4. A method according to claim 3, wherein said compound is contacted with said solvent at about 50° C.

5. A method according to claim 1, wherein said water-insoluble uranium containing compound is graphito-uranium dioxide press moldings.

6. A method according to claim 1, wherein said water-insoluble uranium containing compound is uranium carbide.

7. A method according to claim 1, wherein said water-insoluble uranium containing compound is metallic uranium.

8. A method according to claim 1, wherein said neutral organic solvent is selected from the group consisting of tributyl phosphate, dibutyl butylphosphonate, ethyl ether, methylisobutyl ketone and butyl acetate.

9. A method according to claim 1, wherein the organic solvent is mixed with a water-insoluble diluent.

References Cited by the Examiner
UNITED STATES PATENTS
2,869,980  1/1959  Grinstead _____ 23—14.5

FOREIGN PATENTS
822,290  10/1959  Great Britain.

OTHER REFERENCES
AEC Document ORNL-2615, "Chemistry—Separation Processes for Plutonium and Uranium," Jan. 5, 1959, page 5.
Bruce et al.: "Process Chemistry," Series III, Pergamon Press, 1959, pages 14–15.
Bruce et al.: "Process Chemistry," volume 3, Series III, Pergamon Press, 1961, pages 188–195.
Clegg et al.: "Uranium Ore Processing," Addison-Wesley Publishing Co., 1958, page 265.
German application, 1,084,255, printed June 30, 1960.

L. DEWAYNE RUTLEDGE, *Primary Examiner.*

CARL D. QUARFORTH, *Examiner.*

L. A. SEBASTIAN, A. G. BOWEN, S. TRAUB,
*Assistant Examiners.*